United States Patent [19]

Steidinger

[11] Patent Number: 4,664,416

[45] Date of Patent: May 12, 1987

[54] METHOD OF MAKING LABEL-EQUIPPED BUSINESS FORM

[75] Inventor: Donald J. Steidinger, Barrington, Ill.

[73] Assignee: Wallace Computer Services, Inc., Hillside, Ill.

[21] Appl. No.: 797,846

[22] Filed: Nov. 14, 1985

Related U.S. Application Data

[63] Continuation-in-part of Ser. No. 669,000, Nov. 6, 1984, abandoned.

[51] Int. Cl.[4] .......................... B32B 31/00; B41L 1/08

[52] U.S. Cl. .......................... 282/11.5 A; 283/81; 156/519; 156/289

[58] Field of Search .......................... 282/11.5 A, 27 R; 283/81; 156/277, 289, 265, 519, 521, 578, 289, DIG. 33, DIG. 35

[56] References Cited

U.S. PATENT DOCUMENTS

| | | | |
|---|---|---|---|
| 2,560,566 | 7/1951 | Graves et al. | 156/519 X |
| 3,869,328 | 3/1975 | Instance | 156/289 X |
| 3,933,564 | 1/1976 | Jensen | 156/519 X |
| 3,993,814 | 11/1976 | Cavender | 156/277 X |
| 4,021,060 | 5/1977 | Seeley et al. | 156/289 X |
| 4,035,218 | 7/1977 | Yount | 156/289 |
| 4,277,089 | 7/1981 | Lockhart | 282/27 R |

*Primary Examiner*—Howard N. Goldberg
*Assistant Examiner*—Taylor J. Ross
*Attorney, Agent, or Firm*—Tilton, Fallon, Lungmus & Chestnut

[57] ABSTRACT

A method of making a label-equipped business form in which a continuous web of business form material is advanced and simultaneously therewith a single ply label-providing web is advanced through an adhesive applying station and thereafter severed and labels derived therefrom applied to the continuous web of business form material.

6 Claims, 4 Drawing Figures

FIG. 1
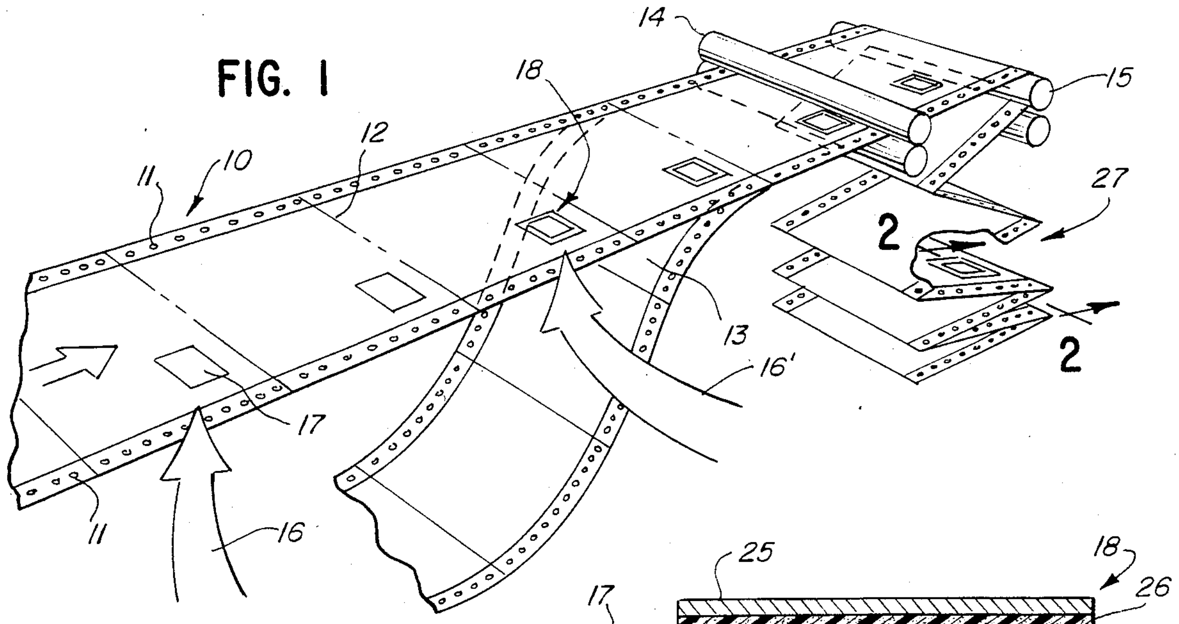
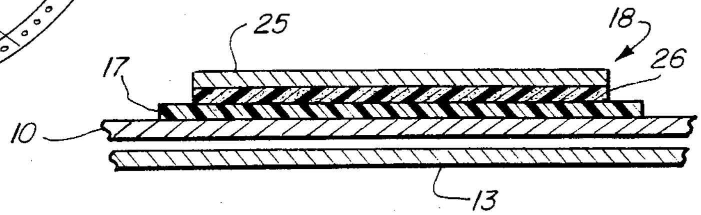
FIG. 2
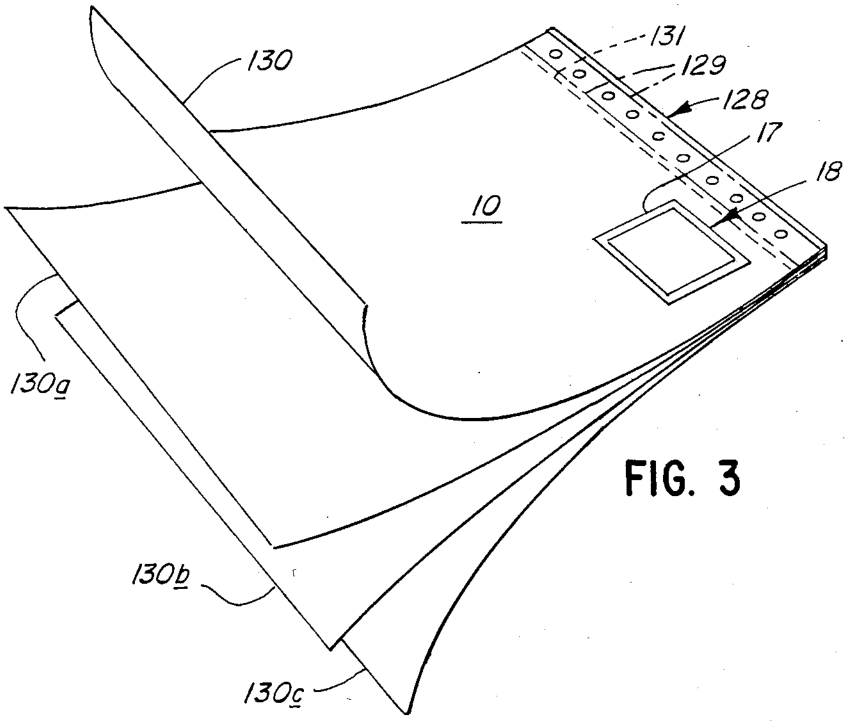
FIG. 3
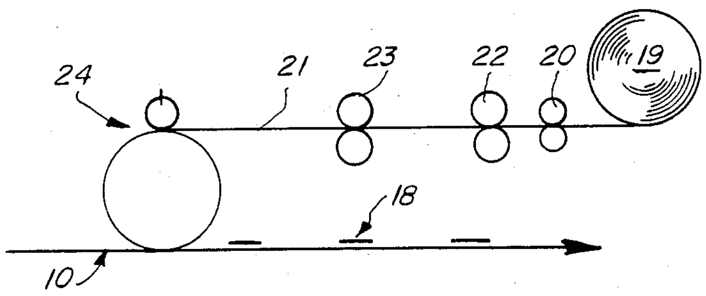
FIG. 4

METHOD OF MAKING LABEL-EQUIPPED BUSINESS FORM

This application is a continuation-in-part of my co-pending application Ser. No. 669,000 filed Nov. 6, 1984 now abandoned.

BACKGROUND AND SUMMARY OF INVENTION

It is advantageous for some business systems and promotional graphics to provide a label having a pressure sensitive adhesive which is attached to the forms so the computer can print information on the label at the time other information is added to the form. At other times the label is not computer imaged but is attached to the form for convenient use when needed.

The common practice in attaching labels to forms is to use a three layer label. The top layer is the label with a pressure sensitive adhesive on its back. The second or middle layer is a paper ply with a release coating on the face and a pressure sensitive adhesive coating on its back. The third layer is a paper with a release coating on its face.

In use, the three layer label which has been manufactured in advance as an assembly is fed into a label applicator. The bottom layer is peeled off thus exposing the pressure sensitive adhesive coating on the back of the middle layer. The bottom layer is used to transport the labels through the applicator device and then is disposed of as waste. The pressure sensitive adhesive layer on the back of the middle layer is used to attach the label to the form.

Finally, the user peels off the top layer which is the label with a pressure sensitive adhesive on its back. This label can then be attached to a package as a shipping label, to a product for identification or however needed. The middle layer remains attached to the form by the pressure sensitive adhesive on its back surface and, in effect, becomes waste.

The assignee hereof made an improvement to this pressure sensitive form by using a two layer label. The top layer is again a label with a pressure sensitive adhesive on its back. The second layer is a paper ply with a release coating on its face. This, however, has been manufactured in advance as an assembly. The assembly, at the time of application to the business form, is unrolled and adhesive is applied to the back of the second layer. The assembly is then cut at longitudinally spaced intervals and discrete two layer labels applied to an advancing business form web.

The use of the form is very similar to the three label version in that the label (layer 1) is peeled off and attached where needed and layer 2 remains attached to the form as waste. This two layer label has a significant cost savings in that it costs only 40 to 60% as much as the three layer label. This is a very important savings because the label material is on the order of 10 times the cost of the business forms.

It is an objective of this invention to provide a form with a pressure sensitive label attached that will give improved computer image in the area beneath the pressure sensitive label by eliminating the release coated bottom layer. Typically, this ply is on the order of 0.004" thick and is a relatively stiff material that substantially interferes with imaging whether by means of carbonized tissue, spot carbon coating or carbonless coating.

It is another objective of this invention to substantially reduce the cost of the pressure sensitive label applied to the form. This is accomplished first by eliminating the waste layers of the previous practice and second by using a method that can be completely performed on the line—thus eliminating the three step process of the present method, i.e., first laminating the top layer with the bottom layer—and sometimes even a middle layer—by a label material converter. Secondly, the label assembly is printed and die cut. Thirdly, the bottom layer is removed from the assembly and discarded. Only then can the label be attached and registered to the form.

According to the invention a single ply of label-providing web is employed. This may be paper, foil, or film and usually is a heavier basis weight than the business form. At the time and place of application of the label to the business form web, a coating of adhesive is applied to the label providing web. This adhesive may be pressure sensitive but the adhesive may take other forms and characteristics depending upon the ultimate use. After coating, the label providing web is cut to provide individual labels that are applied sequentially to an advancing business form web.

In the illustrated embodiment, the business form web is equipped with an area of release coating to which the label is applied. When certain easily releasable pressure sensitive adhesives are employed, it may not be necessary to use a release coating on the business form. From this summary, it will be appreciated that the invention eliminates a need for separate conversion as well as waste layer or layers.

The invention is described in conjunction with the accompanying drawing, in which:

FIG. 1 is a perspective schematic view of a continuous web in the process of being equipped with labels according to the instant invention;

FIG. 2 is an enlarged sectional view taken along the sight line 2—2 of FIG. 1;

FIG. 3 is a perspective view of a "snap-out" multiply business form incorporating teachings of this invention; and FIG. 4 is a schematic view of label preparation and application.

DETAILED DESCRIPTION

In the illustration given and with reference first to FIG. 1, the numeral 10 designates generally a continuous web which is intended to become a ply of a multiple ply business form. Alternatively, it could be used as a single ply form. Conventionally, the webs or plies in a business form are equipped with control punch margins as at 11 to facilitate not only production but advancement through the computer printer. Also indicated in FIG. 1 are a number of lines of potential weakening or severance indicated by the numeral 12. These define the series of identical forms.

For a multi-ply form, the various plies are normally assembled together in superposed relation in a collator and a schematic representation of a collator can be found in my earlier U.S. Pat. No. 4,109,936. Thus, the additional plies are represented schematically in FIG. 1 by the ply 13.

After the plies have all been assembled in the collator, cross perforation or severance is performed as by the perforator or cutter schematically represented in FIG. 1 and designated by the numeral 14 in the upper right hand portion of FIG. 1. This results in perforations in the illustration given along the lines of potential weakening 12 previously referred to. Following perforation, zig-zag folding is normally performed and a folder 15 is schematically represented in the upper right hand portion of FIG. 1. As pointed out previously, the invention is not limited to the practice of this preferred version of business form although it is expected that this zig-zag version will be the preferred usage of the instant invention. For example, if the mechanism 14 is a cutter, a stack of individual forms is provided.

The large arrow 16 in the lower right hand portion of FIG. 1 designates a release coating station for the application of a pattern of release coating to the web 10. The release coating area 17 can be made up of a conventional silicon release material. In the illustrated embodiment, it will be noted that the release coating 17 occupies only a portion of each business form and, advantageously, a portion of the area of each business form length. It may be advantageous in some applications to have the release coated area 17 greater in extent, and even continuous viz., as along one margin just inboard of the control punch margin 11. The release coated portion 17 can be printed on the web 10 in the collator, or, preferably, on the press which prints the format of the form on the various plies before the rolls thereof are mounted on the spindles of the collator. Again, in the event an easily releasable adhesive is employed on the label, it is unnecessary to provide the release coated area 17.

Irrespective of at what point in the manufacture the release coatings 17 are applied—again preferably in longitudinally spaced relation relative to the continuous web 10, a label generally designated 18 is applied to the web 10 on the release coated portion 17 at the label applying station 16'. In the illustration given, this again can be done either on the press in the case of single ply forms or on the collator.

Label Preparation

According to the invention, label stock which can take the form of paper, foil, or film, is provided in a supply roll 19 (see FIG. 4). Feed rolls 20 are provided as part of the label application station 16' for advancing the web 21 from the supply roll 19. As the web 21 is unwound from the supply roll 19, it advantageously passes through a printing station which is schematically represented as at 22. Thereafter, the web 21 passes through an adhesive applying station 23. Thereafter the web is passed through a cut-off-transfer station 24 which provides discrete labels, each having its back coated with adhesive for application to the business form.

Reference to FIG. 2 reveals that the label 18 includes a layer 25 of printable material having upper and lower faces. The lower face is equipped with a pressure sensitive adhesive 26 which may be of a variety of types such as the hot melt type or the solvent type. In the hot melt type it is only necessary to have the hot melt pressure sensitive adhesive cool before application whereas in the solvent type (water usually being the solvent), drying may be required before application to the upper surface of the web 10. It is sometimes advantageous to apply the adhesive 26 so that it does not extend all the way to the edge of the label 18 in order to avoid oozing of the adhesive out beyond the edge of the label 18 in time or as the result of heat or pressure in processing or packaging of the forms with labels attached. Another reason to leave an edge uncoated is to improve the ease with which the label can be gripped for removal from the form. The thickness of the pressure sensitive adhesive 26 and the release coating 17 are exaggerated in the drawing for purposes of clarity. Typically these coatings are much less than the thickness of the plies 25 and 10. The invention, therefore, includes application of adhesive to the web 10 in various patterns.

In use, the zig-zag folded stack generally designated 27 in FIG. 1 is developed by cutting transversely after a predetermined number of business form lengths have been accumulated—say 1,000. Thereafter the business forms stack is cartoned and transported to the customer for computer printing. After computer printing the various forms are "burst" apart from the continuous sequence and employed for the purpose intended. One such purpose is to provide the customer with a number of duplicate forms identically printed for the shipment of merchandise. In such a case, the label 18 is removed from the business form and applied to the carton for the merchandise to serve as a shipping label. This is the normal procedure where only one piece of merchandise is being shipped—as contrasted to the stencil assembly described in my prior U.S. Pat. No. 3,926,113 which shows a method for developing a number of labels for shipment of multiple cartons.

Another advantageous version of the invention can be seen in FIG. 3. There a business form of the "snap-out" variety is generally designated by the numeral 128. Such a business form is again usually developed on a collator to superpose the various plies. In the illustration given in FIG. 3, the various plies are united along one edge by bands of adhesive as at 129. The opposite edges as at 130, **130*a*. 130*b*, and 130*c* are not so united so that the various plies can be individually separated or "snapped out" along a line of longitudinal perforation 131. Again, however, the uppermost ply 10 has a portion thereof equipped with a coating of release material 17 which advantageously extends beyond the perimeter of label 18**.

In the practice of the invention, the pressure sensitive adhesive coating 26 is advantageously applied to the printable material 25 of the label, viz., usually paper, so that a release coated ply—that eventually would be discarded—is not needed.

Other operations can also be done on the label such as printing, die cutting, perforating, plastic film over laminating, etc. as are common in label manufacture. These operations are preferably done on line but some could be done off line if desired.

It is sometimes desirable to provide for the computer image on the label to be recorded on the form ply 10 to which the label 18 is attached. This can be accomplished according to the invention in a variety of ways. For example, the web 10 may be a self-contained carbonless image sheet. Alternatively, the web 10 may be of translucent material and have underlying it a carbon tissue facing the back of the ply 10 so that the image shows through from the back of the ply 10. Still further it is possible to spot coat a carbonless imaging material in the area under the pressure sensitive adhesive label on the form ply.

While in the foregoing specification a detailed description of the invention has been set down for the purpose of illustration, many variations in the details herein given may be made by those skilled in the art without departing from the spirit and scope of the invention.

I claim:

1. The method of making a label-equiped business form comprising advancing a web of business form material through a first application station, said web having longitudinally spaced transversely extending lines of potential weakening defining discrete form lengths between adjacent transverse lines, applying a release coating in said first station to a portion of at least some of said forms, advancing the release coating equipped forms sequentially through a second application station, simultaneously and continuously therewith advancing in the same direction at a speed slower than that of the advancing business form material web a single ply label-providing web through an adhesive applying station, severing labels sequentially from said label-providing web after said adhesive has become pressure sensitive and immediately applying the same to said continuous web of business form material at said second application station in longitudinally spaced relation.

2. The method of claim 1 in which the release coating is provided on a collator.

3. The method of claim 1 in which said release coating is provided on a press.

4. The method of claim 1 in which said web following label application is zig-zag folded.

5. The method of claim 1 in which said web is transversely cut along said transverse lines subsequent to label application.

6. The method of claim 5 in which a plurality of plies are adhesively secured to said web to provide a snap-out form.

* * * * *